(12) United States Patent
Lawton et al.

(10) Patent No.: US 6,228,496 B1
(45) Date of Patent: May 8, 2001

(54) SIZING COMPOSITION FOR GLASS FIBERS

(75) Inventors: Ernest L. Lawton, Allison Park, PA (US); Michael L. Gunther, Danbury, CT (US); Eric R. Pohl, Mt. Kisco, NY (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/320,520

(22) Filed: May 26, 1999

(51) Int. Cl.$^7$ ........................................ B32B 25/20
(52) U.S. Cl. ..................... 428/391; 428/378; 428/392; 442/59
(58) Field of Search ..................... 428/391, 392, 428/375, 378; 442/59

(56) References Cited

U.S. PATENT DOCUMENTS

| | | | |
|---|---|---|---|
| 2,868,668 | 1/1959 | Caroselli et al. | 117/46 |
| 3,502,456 | 3/1970 | Fetner | 65/32 |
| 3,676,094 | 7/1972 | Russell | 65/3 |
| 4,122,074 | 10/1978 | Pepe et al. | 526/26 |
| 4,526,996 | 7/1985 | Kilgour et al. | 556/413 |
| 4,584,138 * | 4/1986 | Pepe et al. | 260/404.5 |
| 4,668,716 * | 5/1987 | Pepe et al. | 523/213 |
| 4,689,085 * | 8/1987 | Plueddemann | 106/287.14 |
| 5,120,363 * | 6/1992 | Puckett | 106/213 |
| 5,334,639 | 8/1994 | Rice | 524/47 |
| 5,393,335 * | 2/1995 | Puckett et al. | 106/211 |
| 5,773,146 * | 6/1998 | Lawton et al. | 428/392 |
| 5,948,927 * | 9/1999 | Gunther et al. | 556/419 |

FOREIGN PATENT DOCUMENTS

| | | |
|---|---|---|
| 7197380 | of 1995 | (JP) . |
| WO94/11318 | of 1994 | (WO) . |

OTHER PUBLICATIONS

*Organic Chemistry* Second Edition by Morrison and Boyd (1966) pp. 972–974.
ASTM D 578–96 Glass Fiber Strands (Feb. 1997).
ASTM D 578–98 Glass Fiber Strands (Jul. 1998).
ASTM D 2256–97 Glass Fiber Strands (Mar. 1997).

* cited by examiner

Primary Examiner—William Krynski
Assistant Examiner—J. M. Gray
(74) Attorney, Agent, or Firm—Andrew C. Siminerio

(57) ABSTRACT

The present invention provides a glass fiber strand comprising at least one glass fiber at least partially coated with a sizing composition prepared from ingredients comprising; at least one starch; at least one lubricant; and at least one silane coupling agent comprising: $[((R^1)_bY)_aR^2_{3-a}SiR^{3\,1}_2NX$, wherein $R^1$ and $R^2$ are each monovalent radials; $R^3$ is a divalent linking group; a is 1 to 3; X is $(R^4)_bZC(=O)CH(Q)CH(Q)$—, wherein Z is $CH_2$, O, S or N, Q is H, alkyl, aryl, alkaryl, or $C(=O)ZR^4$ and $R^4$ is a hydrocarbon moiety of one to twenty carbon atoms, hydrogen, a silyl group or an organic polymer; Y is oxygen, nitrogen or sulfur; and b is 1 or 2 depending upon the valency of Y. In one particular embodiment of the invention, the silane in the aqueous sizing composition is $(CH_3)_3COC(=O)CH_2CH_2N[CH_2CH_2CH_2Si(OCH_3)_3]_2$.

29 Claims, No Drawings

SIZING COMPOSITION FOR GLASS FIBERS

BACKGROUND OF THE INVENTION

1. Field of the Invention

The present invention is directed to starch-oil type sizing compositions for glass fibers which provide improved tensile strength and heat cleaning properties in glass fibers treated with a composition.

2. Technical Considerations and Prior Art

Glass fibers are typically coated after forming with a sizing composition that imparts desired properties as discussed below. As used herein, the term "size", "sized", "sizing" means a coating composition applied to the glass fibers immediately after formation of the fibers. The sizing composition functions as a lubricant and binding agent to protect the fibers from abrasion with each other, increase the tensile strength of the strand and improve the performance of the fibers during further processing, such as but not limited to weaving of the fibers to produce a fabric. The sizing is also used to impart to fabrics that are woven from treated fibers a surface that is smooth and has few visible defects.

Although not required, the size applied to glass fibers that are typically used in a weaving operation is a "starch-oil sizing", which is a term commonly used in the art and as used herein means a treatment for fibers having at least one silane, at least one starch and at least one lubricant which is applied to the glass fibers to impart desired properties. Typically, the starch-oil size applied to textile fibers is removed after weaving so as to develop maximum integration between protective color coatings or polymers subsequently applied to the fabric and the glass fiber surfaces. The fibers can be cleaned by a water wash or by solvents but it is preferred to burn the size from the glass fiber surfaces. The heat cleaning operation can be accomplished in a single or multiple steps in a manner well known to those skilled in the art. For example and without limiting the present invention, in a single-step operation, the woven fabric is passed through a radiant oven and exposed to temperatures of between about 538° C. to about 677° C. (about 1000° F. to about 1250° F.) for a period long enough to volatilize and burn the organic constituents of the sizing composition. In multi-stage operations, the fabric is exposed to high temperatures for a shorter period of time and collected on a roll. The roll is then placed in a second oven and exposed to lower elevated temperatures for a sufficient period of time to heat the fabric and volatilize the remaining organic sizing constituents. Typically, the heat-cleaning process reduces the loss on ignition to about 0.1 to about 0.4. In applications that incorporate the fabric into laminates for supports used in the electronics industry, such as but not limited to printed circuit boards, the loss on ignition can be as low as about 0.05 or less.

It has been found that the dramatic thermal treatment of the glass fibers during a heat-cleaning process can reduce the glass fiber tensile strength by as much as about 70%. In addition, the heat cleaning presents the continual problem of leaving undesired colored residue deposits on the glass fiber fabric.

U.S. Pat. Nos. 5,120,363; 5,334,639 and 5,393,335 disclose aqueous starch-oil sizing compositions, which improve processability in woven and non-woven applications. The sizing combines starch, lubricants and silane coupling agents, emulsifiers, defoamers and biocides can also be included in the sizing composition.

WO 94/11318 discloses sizing compositions, which include bis-silanes useful for glass fiber reinforcements in the area of filament winding and pultrusion.

U.S. Pat. No. 3,502,456 discloses a process and apparatus for heat cleaning glass fiber fabric. In order to remove the sizing composition, the sized fabric is moved continuously through a cleaning chamber, which applies size-volatilizing heat to the glass fiber fabric, by the convection action of gases generated by combustion of a pressure-fed fuel.

It would be advantageous to provide a sizing composition, which can be removed by a heat cleaning process while maintaining a high tensile strength in the glass fibers and reducing the possibility of leaving colored residue deposits on the heat cleaned glass fiber fabric.

SUMMARY OF THE INVENTION

The present invention provides a glass fiber strand comprising at least one glass fiber at least partially coated with a sizing composition prepared from ingredients comprising; at least one starch; at least one lubricant; and at least one silane coupling agent comprising: $[((R^1)_bY)_aR^2{}_{3-a}SiR^3]_2NX$, wherein $R^1$ and $R^2$ are each monovalent radials; $R^3$ is a divalent linking group; a is 1 to 3; X is $(R^4)_bZC(=O)CH(Q)CH(Q)$—, wherein Z is $CH_2$, O, S or N, Q is H, alkyl, aryl, alkaryl, or $C(=O)ZR^4$ and $R^4$ is a hydrocarbon moiety of one to twenty carbon atoms, hydrogen, a silyl group or an organic polymer; Y is oxygen, nitrogen or sulfur; and b is 1 or 2 depending upon the valency of Y. In one particular embodiment of the invention, the silane in the aqueous sizing composition is $(CH_3)_3COC(=O)CH_2CH_2N[CH_2CH_2CH_2Si(OCH_3)_3]_2$. Another aspect of the present invention is a fabric woven from these strands.

Still another aspect of present invention is the aqueous sizing composition for glass fibers referred to above prepared from ingredients comprising, in addition to water; at least one starch; at least one lubricant; and at least one silane coupling agent comprising: $[((R^1)_bY)_aR^2{}_{3-a}{}^{SiR3}]_2NX$, wherein $R^1$ and $R^2$ are each monovalent radials; $R^3$ is a divalent linking group; a is 1 to 3; X is $(R^4)_bZC(=O)CH(Q)CH(Q)$—, wherein Z is $CH_2$, O, S or N, Q is H, alkyl, aryl, alkaryl, or $C(=O)ZR^4$ and $R^4$ is a hydrocarbon moiety of one to twenty carbon atoms, hydrogen, a silyl group or an organic polymer; Y is oxygen, nitrogen or sulfur; and b is 1 or 2 depending upon the valency of Y. In one particular embodiment of the invention, the silane in the aqueous sizing composition is $(CH_3)_3COC(=O)CH_2CH_2N[CH_2CH_2CH_2Si(OCH_3)_3]_2$.

DETAILED DESCRIPTION OF THE INVENTION

The present invention discloses glass fiber strands including at least one glass fiber, and preferably a plurality of glass fibers, having a coating or sizing composition applied to at least a portion of the surface of the glass fiber(s) to protect the fiber surface from abrasive during processing. Typically, the sizing composition is applied immediately after the glass fibers are formed and before the glass fibers are collected into strands and wound on a winder to form a forming package. The forming package is then typically dried in an oven to remove excess moisture from the fibers, leaving a dried residue of the sizing on at least a portion of the glass surface.

The present invention also discloses a starch-oil sizing for coating glass fibers that are in one embodiment subsequently woven into a fabric, which includes at least one silane, at least one starch and at least one lubricant.

Glass fiber strands formed from glass fibers coated with the sizing composition of the present invention exhibit good tensile strength properties and fabrics incorporating these strands exhibit good heat cleaning properties. More specifically, the heat cleaned fabrics exhibit reduced amounts of streaking and discoloration, as will be discussed later in more detail. This is indicative of less colored residue deposits left on the fabric after heat cleaning. It is believed that the silanes used in the sizing composition of the present invention contribute to these improved properties.

The starch-oil size of the present invention includes silanes, and in particular, organo functional silane compounds, as coupling agents between the predominantly organic size and the inorganic glass. Although the amount can vary, generally the amount of the silane coupling agent present in the starch-oil sizing is generally between about 0.5 and about 8 weight percent of the sizing on a nonaqueous basis. The silanes used in the present invention have features that result in good glass fiber fabric strength and improved heat cleaning when woven into fabric. More particularly, the silanes provide good strand tensile strength prior to exposure to heat and allow the sizing to be more easily removed when exposed to the elevated temperatures of a heat cleaning process. In addition, the silanes used in the starch-oil sizing of the present invention leave little, if any, colored residue deposits on the glass fiber fabrics after heat cleaning.

In the present invention, the silane is a bis-silyl tertiary amine having the formula:

$$[((R^1)_b Y)_a R^2{}_{3-a} SiR^3]_2 NX \qquad (I)$$

wherein $R^1$ and $R^2$ are monovalent radicals, $R^3$ is a divalent radical, X is a monovalent carbonyl containing radical, Y is oxygen, nitrogen or sulfur, a=1 to 3, and b=1 or 2 depending on the valence of Y. This silane provides controlled reactivity and good adhesion.

In Formula (I) above, each $R^1$ is a monovalent radical, e.g., hydrogen, a silyl group, an imino group, a dialkyl amine, or, preferably a hydrocarbon functionality, including, but not limited to, aryl, allyl, cycloalkyl, alkyl (linear or branched) or aralkyl that can contain heteroatoms, e.g., oxygen, nitrogen or sulfur. $R^1$ could also be a silyl functionality or an acyl functionality (e.g., trimethoxysilyl, or acetyl). Examples of $R^1$ are $-N=C(CH_3)_2$, $-Si(OCH_3)_3$; and $-CH=CHCH_3$. Most preferably, $R^1$ is an alkyl of 1 to 10 carbon atoms, e.g., methyl, ethyl, isopropyl, cyclohexyl, or t-butyl.

Y is a heteroatom selected from oxygen, nitrogen or sulfur. The value of b depends on the valency of Y, i.e., b=1 for Y=oxygen or sulfur, and b=2 for Y=nitrogen. Preferably Y is oxygen.

Preferably a is 3, but if a<3, each $R^2$ is a monovalent radical, including, but not limited to, a hydrocarbon radical, a saturated hydrocarbon, an unsaturated hydrocarbon or cyano. Preferably $R^2$ is a cycloalkyl, alkyl (linear or branched) or aralkyl, that can include heteroatoms, e.g., oxygen, nitrogen, or sulfur. Exemplary $R^2$ include, phenyl, phenylethyl, 3-oxobutyl or 2-methoxypropyl. Most preferably $R^2$ is methyl or ethyl.

$R^3$ is a divalent bridging group, including, but not limited to an alkylene, alkarylene, arylene, or polyalkylene oxide, but preferably is a $C_1$–$C_{12}$ alkylene, e.g., propylene or butylene, and can be branched, e.g., neopentylene, cyclic, e.g., dimethylene cyclohexane, or unsaturated, e.g., dimethylene cyclohexene. $R^3$ can include a heteroatom substituents, e.g., $R^3$ can include an amino group either in the backbone or pendant to the backbone. If $R^3$ includes an amine functionality, each amine therein is a tertiary amine. Specific examples of $R^3$ are propylene, n-butylene, phenylene, di(ethylene) ethyl amine, and polyoxyethylene.

X is a carbonyl containing monovalent radical, e.g., keto, ester, thioester or amide radical. Preferable embodiments of X can be expressed by the formula:

$$(R^4)_b ZC(=O)CH(Q)CH(Q)- \qquad (II)$$

Z is $CH_2$, O, S or N (depending on whether X is a keto, ester, thioester or amide, respectively). Q is H, alkyl, aryl, alkaryl, or $(R^4)_b ZC(=O)-$. $R^4$ is a hydrocarbon moiety of one to twenty carbon atoms that can contain heteroatoms, a hydrogen, a silyl, or an organic polymer, e.g., polyester, polyurethane, polyether, polysulfide or polyamide, that itself can contain one or more $ZC(=O)CHQCHQN[R^3 SiR^2{}_{3-a}(Y(R^1{}_b)_a]_2$ groups. $R^4$ preferably is an alkyl (linear, cyclic or branched), aryl or alkaryl, and more preferably an alkyl of one to four carbon atoms. Q is preferably hydrogen. The value of b, as in Formula I, depends on the valency of Z, e.g., b=1 for Z=oxygen or sulfur, and b=2 for Z=nitrogen.

Specific examples of X include:
$(CH_3)_3 COC(=O)CH_2 CH_2-$,
$CH_3 OC(=O)CH(CH_3)CH_2-$,
$(CH_3 CH_2)OC(=O)CH_2 CH(CH_3)-$,
$(CH_3)_2 CHOC(=O)CH_2 CH_2(C_6 H_5)-$,
$CH_3 OC(=O)CH_2 CH[C(=O)OCH_3]-$,
$H_2 C=CHOC(=O)CH_2 CH_2-$,
$C_6 H_5 OC(=O)CH_2 CH_2-$,
$C_6 H_5 CH_2 OC(=O)CH_2 CH_2-$,
$CH_3 C(=O)(CH_2 CH_2 O)_5 C(=O)CH_2 CH_2-$,
$CH_3 C(=O)OC_6 H_4 OC(=O)CH_2 CH_2-$,
$CH_3 OC(=O)CH_2 CH(CN)-$,
$C_6 H_{11} OC(=O)CH_2 CH_2-$,
$H_2 NC(=O)CH_2 CH_2-$,
$(CH_3)_2 NC(=O)CH_2 CH_2-$,
$(CH_3)_2 CHNHC(=O)CH_2 CH_2-$,
$H_2 C=CHCH_2 NHC(=O)CH_2 CH_2-$,
$CH_3 SC(=O)CH_2 CH_2-$,
$CH_3(CH_2)_3 SC(=O)CH_2 CH_2-$,
$C_6 H_5 SC(=O)CH_2 CH_2-$,
$CH_3 C(=O)CH_2 CH_2-$,
$C_6 H_5 C(=O)CH_2 CH_2-$,
$H_2 C=CHCH_2 C(=O)CH_2 CH_2-$,
$CF_3 C(=O)CH_2 CH_2-$, and
$[(CH_3 O)_3 Si(CH_2)_3]_2 NCH_2 CH_2 C(=O)O[CH_2 CH_2 OC(=O)(CH_2)_4 C(=O)O]_{10} C(=O)CH_2 CH_2-$ Specific examples of the bis(silyl) amines that are useful in the present invention include:
$[(CH_3)_3 Si(CH_2)_3]_2 NCH_2 CH_2 C(=O)OC(CH_3)_3$,
$[(CH_3 O)_3 SiCH_2 CH_2 CH_2 N(CH_2 CH_2 C(=O)NH_2)CH_2-]_2$,
$[(CH_3)_2 CH\ O)_3 SiCH_2 CH_2 C_6 H_4]_2 NCH_2 CH_2 C(=O)CH_3$,
$[(CH_3 O)_3 SiOSi(OCH_3)_2 CH2CH2CH2N(CH_2 CH_2 C(=O)NH_2)CH_2-]_2$,
$[(CH_3 CH_2\ O)_2 Si(CH_3)CH_2 CH_2 C(CH_3)_2 CH_2]_2 NCH_2 CH_2 C(=O)SCH_3$,
$[(CH_3)_2 C=NO)_3 SiCH_2 CH_2 C(CH_3)_2 CH_2]_2 NCH_2 CH_2 C(=O)SCH_3$, and
$[(CH_3 O)_3 Si(CH_2)_3]_2 NCH_2 CH_2 C(=O)O[CH_2 CH_2 OC(=O)(CH)_2)_4 C(=O)O]_{10} CH_2 CH_2 OC(=O)CH_2 CH_2 N[(CH_2)_3 Si(OCH_3)_3]_2$.

Further nonlimiting examples of silanes useful in the present invention can be found in U.S. patent application Ser. No. 09/053,292, which is hereby incorporated by reference.

The silanes of the present invention are made by Michael addition reaction chemistry from the corresponding bis-silyl secondary amine and an α,β- unsaturated carbonyl compound including, but not limited to, ketones, esters, thioesters, amides and organic polymers that contain at least one α,β- unsaturated carbonyl groups, e.g., unsaturated polyesters, unsaturated polyamides or vinyl esters.

The α,β- unsaturated carbonyl containing compounds are $(R^4)_b ZC(=O)CQ=CHQ$, wherein $R^4$, Z, Q and b are as in Formula (II) above.

Suitable ketones include alkyl vinyl ketones, allyl vinyl ketones, and phenyl vinyl ketones. Suitable esters include acrylate, methacrylate, crotonate, cinnimate, maleate, sorbate, itaconate and fumarate esters of methyl, ethyl, propyl, butyl, phenyl and benzyl. A preferred ester is t-butyl acrylate. The corresponding S or N containing compounds are useful as well. Organic polymers that contain α,β-unsaturated carbonyl functional groups including unsaturated polyesters that are made from condensation of diols with diacids of which some of the diacids contain α,β-unsaturated carbonyls, e.g., fumaric or maleic acid, vinyl esters, and acrylate capped polyethers, polyamides and polysufide polymers.

The bis-silyl amines for the Michael reaction are of the formula:

$$[((R^1)_b Y)_a R^2_{3-a} SiR^3]_2 NH \qquad (III)$$

where $R^1$, $R^2$, $R^3$, a, b, and Y are as in Formula I. Specific examples of these silanes are bis-(3-trimethoxysilylpropyl) amine, bis-(3-triethoxysilylpropyl) amine, N-(3-trimethoxysilylpropyl)-N-(4-trimethoxysilylphenyl) amine and bis(-3-triisopropoxysilylpropyl) amine. Such bis-silyl amines are available under the tradename, SILQUEST® A-1170, for bis-(3-trimethoxysilylpropyl) amine from Witco Corporation. Moreover, diamines can be used, wherein each amine would react with an acrylate. For example $((R^{1)}_b Y)_a R^2_{3-a}Si$——NH—$(CH_2)_n$—$SiR^2_{3-a}(Y(R^1_b))_a$ wherein each "n" is individually 1 to 10 can be used. Moreover, these amines can be made according to the methods known in the art, e.g. as taught in U.S. Pat. No. 4,526,996 (see column 5 line 54 through column 11 line 26).

The Michael adduct reaction chemistry is known in the art. For details, reference is made to the disclosures in Morrison and Boyd, *Organic Chemistry* ($2^{nd}$ edition 1966) at pages 972–974, and U.S. Pat. No. 4,122,074, which are incorporated herein by reference. The reaction preferably is run at an excess of amine to avoid the presence of unreacted acrylates in the final product. Although not required, the process can be run with a condensation catalyst. The reaction temperature is 65° to 140° C. (149° to 284° F.) and reaction time is typically 6 to 100 hours. The resultant product can be distilled or filtered to purify same.

Because sizing compositions containing these silanes are more easily removed from glass fibers than sizing compositions containing prior art silanes, they have the potential for improving the appearance of fabrics made from the glass fibers after a heat cleaning process. In addition the silanes provide the potential for reducing the temperature and/or time at which the glass fiber fabric is exposed to elevated temperatures during heat cleaning so as to improve the overall strength and appearance of the fabric.

The starch-oil sizing composition of the present invention also includes a starch. Although not required, the starch-oil sizing composition preferably comprises amylose-containing starches derived from any starch sources including but not limited to corn, wheat, potato, tapioca, waxy maze, sago, rice, hybrid starches, etc. Starch components having a high amylose content, for example, 50 or more percent by weight, are usually derived from either corn starch or a hybrid corn starch, while the starch components having a low amylose content, for example 20 to 30 percent by weight, are usually derived from either potato or cationic phosphatized ethoxylated or etherified corn starch. Without limiting the present invention, examples of starches that can be used include HISET 369 starch, which is a propylene oxide modified corn starch, and NATIONAL 1554 starch, which is a potato starch, both commercially available from National Starch, and AMAIZO 2213 starch, which is a highly crosslinked nonionic low amylose corn starch commercially available from American Maze. Although the amount can vary, generally the starch component of the starch-oil size of the present invention is present in an amount of between about 45 and about 65 weight percent of the sizing on a nonaqueous basis.

The starch-oil sizing of the present invention also includes one or more lubricants. Although not limiting in the present invention, the lubricants are typically nonionic or cationic. Non-limiting examples of nonionic lubricants useful in the present invention include waxes and oils. More particularly, any wax known to those skilled in the art for use in compositions of treatment for glass fibers can also be used. Non-limiting examples of useful waxes include paraffin wax, animal wax, mineral waxes, petroleum derivative waxes and synthetic waxes. Similarly any oil known to those skilled in the art for use in compositions of treatment for glass fibers can also be used. Non-limiting examples of useful oils include vegetable oils hydrogenated to various degrees, such as cotton seed oil, corn oil, soy bean oil, etc. Without limiting the present invention, a lubricant that can be used in the sizing of the present invention is ECLIPSE 102 oil, which is a partially hydrogenated soybean oil commercially available from Loders Croklan, Glen Ellyn, Ill. Although not limiting the present invention, the total of the nonionic lubricant is generally an amount of between about 15 and about 45 weight percent of the starch-oil sizing on a nonaqueous basis.

While essentially any cationic lubricant known in the art can be used in the sizing of the present invention, preferred cationic lubricants are partially amidated polyalkylene imines and alkyl imidazoline derivatives. Non-limiting suitable cationic lubricants include ALUBRASPIN 226 and 261 lubricants commercially available from BASF Corp., EMERY 6717, 4046D and 6760 lubricants commercially available from Henkel Corporation, and CATION-X lubricant commercially available from Lyondell Petrochemical Co. Although not limiting in the present invention, the cationic lubricant is generally present in an amount between about 1 and about 10 weight of the starch-oil sizing on a nonaqueous basis.

Another lubricant which can be present in the starch-oil sizing composition is a polyamino functional polyamide resin, a non-limiting example of which is VERSAMID 140 resin, which is a salt of a polyimino functional polyamide resin commercially available from General Mills.

Humectants can also be used in the starch-oil size of the present invention to promote retention of moisture in the sizing composition. Nonlimiting examples of suitable humectants include polyalkylene polyols and polyoxyalkylene glycols, with a preferred humectant being polyethylene glycols such as MACOL E-300 polyethylene glycol commercially available from BASF Corp. and CARBOWAX 300 and 400 polyethylene glycol commercially available from Union Carbide. Although not limiting in the present invention, the amount of humectant present is generally between 2 and about 15 weight percent of the starch-oil size on a nonaqueous basis.

Any biocides known to those skilled in the art to control organic growth in sizing solutions for glass fibers can also be present in the starch-oil size of the present invention. Nonexclusive biocides that can be used in the present invention include organotin bactericides, methylene thiocyanate bactericides and chlorinated compounds. A nonlimiting example of a chlorinated material is CL-2141 biocide commercially available from ChemTreat, Inc.

The starch-oil size of the present invention can include a defoamer to control foaming in starch-oil treating solutions and any defoamer known to those skilled in the art can be used. Nonlimiting examples of a defoamer include MAZU DF-136 defoamer commercially available from BASF Corp.

Since the starch-oil sizing of the present invention is aqueous, it is necessary to emulsify, disperse or otherwise solubilize the waxes and oils. This can be accomplished through mechanical means or through the use of an emulsifier and any emulsifier known to those skilled in the art to be useful in emulsifying waxes and oils can be used. Although not liming in the present invention, examples of particularly useful emulsifiers are those which are nonionic and have a hydrophilic/lipophilic balance (HLB) in the range of about 8 to about 20 or any mixture with an HLB in this range. HLB is the balance of the size and strength of the hydrophilic (water loving or polar) and the lipophilic (oil loving or non-polar) groups of the emulsifier. A low HLB number (below 9) indicates an emulsifier that is lipophilic in character and a high HLB number (above 11) indicates an emulsifier that is hydrophilic in character. Nonlimiting examples of suitable nonionic emulsifiers include TMAZ 81 emulsifier commercially available from BASF Corp. and TWEEN 81 emulsifier commercially available from Rhône Poulenc. The amount of emulsifier to be used is dictated by the types of lubricants used and the equipment used to mix them. However, and without limiting the present invention, if an emulsifier is used, it is generally between about 1 and about 10 weight percent of the starch-oil sizing on a nonaqueous basis.

To evaluate the effectiveness of the starch-oil sizing of the present invention, the responses of various commercially available silanes and silanes as disclosed herein were tested in a simple model binder consisting of starches, lubricants, emulsifier and biocide as shown in Table 1.

TABLE 1

Model Binder Composition

| Component | Weight Percent |
|---|---|
| starch A[1] | 40.3 |
| starch B[2] | 17.3 |
| nonionic lubricant[3] | 28.9 |
| cationic lubricant[4] | 3.2 |
| emulsifier A[5] | 4 |
| emulsifier B[6] | 1.4 |
| biocide[7] | 0.002 |
| silane | 5 |

[1]NATIONAL 1554 starch commercially available from National Starch.
[2]HISET 369 starch commercially available from National Starch.
[3]ECLIPSE 102 oil commercially available from Loders Croklan.
[4]ALUBRASPIN 261 lubricant commercially available from BASF Corp.
[5]TMAZ 81 emulsifier commercially available from BASF Corp.
[6]IGEPAL CA-630 emulsifier commercially available from Rhone Poulenc
[7]CL-2141 biocide commercially available from ChemTreat, Inc.

The silanes that were tested are listed in Table 2. Silanes A–F are silanes commercially available from Witco Corporation, OrganoSilicones Group, Tarrytown, N.Y. Silanes 1 and 2 are silanes as disclosed herein.

TABLE 2

| Silane | Commercial Name | Chemical Composition |
|---|---|---|
| A | A-162 | $CH_3Si(OCH_2CH_3)_3$ |
| B | A-171 | $CH_2=CHSi(OCH_3)_3$ |
| C | A-187 | $H_2C\overset{O}{-\!\!\!-\!\!\!-}CHCH_2OCH_2CH_2CH_2Si(OCH_3)_3$ |
| | A-1110 | $H_2NCH_2CH_2CH_2Si(OCH_3)_3$ |
| E | A-1170 | $HN[CH_2CH_2CH_2Si(OCH_3)_3]_2$ |
| F | A-1125 | $CH_3OC(=O)CH_2CH_2NHCH_2CH_2NHCH_2CH_2CH_2Si(OCH_3)_3$ |
| 1 | — | $(CH_3)_3COC(=O)CH_2CH_2N[CH_2CH_2CH_2Si(OCH_3)_3]_2$ |
| 2 | — | $CH_3(CH_2)_3OOCCH_2CH_2N[CH_2CH_2CH_2Si(OCH_3)_3]_2$ |

A 4.56 liter (1 gallon) batch of each model binder was prepared as follows.

Step A—65.0 g of ECLIPSE 102 oil was added to an emulsion tank and heated to 79.4° C. (175° F.). 9.3 g of TMAZ 81 emulsifier and 3.1 g of IGEPAL CA-630 emulsifier was then added to the emulsion tank. The materials in the tank were mixed with an Eppenbach mixer while 757.2 g of water was slowly added until the emulsion inverted.

Step B—757.2 g of water was then added to a starch slurry tank and the materials were stirred. 101.9 g of NATIONAL 1554 starch and 43.7 g of HISET 369 starch were then slowly added to the starch slurry tank. A jet cooker was set at 123.8° C. (255° F.) and the cooked starch was pumped to a main mix tank and stirred.

Step C—The emulsion from Step A was transferred to the main mix tank and stirring continued.

Step D—200.0 g of 60° C. (140° F.) water was added to a premix tank and then 19.9 g of ALUBRASPIN 261 lubricant was added while stirring. The materials were then stirred for 15 minutes.

Step E—The Step D premix was added to the main mix tank when temperature of main mix was less than 65.6° C. (150° F.).

Step F—34.2 g of methanol were added to a premix tank and then 16.3 g of the silane were added to the premix tank while stirring. 5.7 g of acetic acid was added to the premix tank and stirring continued. 11.4 g of water was slowly added to the premix tank and the mix was stirred for 30 minutes. An additional 1077.3 g of water was added to the premix tank and the mix was stirred for 5 minutes.

Step G—The premix from Step F was added to the main mix tank.

Step H—0.050 g of CL-2141 was added to the main mix tank.

Step I—The main mix tank was brought up to a volume of 4.56 liters (1 gallon) with 65.6° C. (150° F.) water.

Step J—The solids (target of 6.0%), pH, and temperature were checked.

Step K—The binder was stored and recirculated to a forming position at 63.8° C. (145° F.).

The tensile strength of twisted yarn made from a G75 fiber strand was tested in accordance with ASTM Standards D2256-97 and D578-96, which are hereby incorporated by reference. The yarn had a twist of 0.7 twists per inch. The tensile breaking load was measured using 250 mm (10 inch) gage length specimen having a Configuration A (straight) and a Condition 1 (conditioned to moisture equilibrium for testing with standard atmosphere for testing textiles). The load was applied using an Instrom Model 5500R 1123 material testing system and a head speed of 25.4 centimeters/minute (10 inches/minute). The results of the testing are shown in Table 3.

Yarns coated with sizing made with the various silanes were woven into fabrics and heat cleaned to examine the color quality of the fabric after cleaning. Each tested fabric was a 40.6 cm (16 inch) wide style 7628 woven fabric which used the sizing compositions as discussed above on the fill yarn and a commercially used starch-oil size which included Silane F from Table 2 sizing on the warp yarn. The warp yarn was also coated with a slashing composition that included about 89 wt % polyvinyl alcohol, about 9 wt % polyethylene glycol, and about 2 wt % lubricant. The fabrics were heat cleaned in a set-up designed to accentuate the deposition of colored residue deposits on the fabric. More specifically, each fabric was passed through a series of three 71.1 cm (28 inch) long heaters each of which included a pair of 40.6 cm (16 inch) long infrared heater to heat the fabric along both sides. The temperature at the end of each successive heater was about 163° C. (about 325° F.), about 693° C. (about 1280° F.), and 685° C. (about 1265° F.), respectively. The fabric passed through the ovens at a speed of about 2.44 m/min (8 ft/min) and had an exit temperature at the end of the last oven of about 260° C. (about 500° F.).

The heat cleaned fabric was examined at about 0.9, 2.7 and 4.5 m (about 1, 3 and 5 yards) from the end of the fabric. These areas were selected because the end of the fabric corresponds to those portions of the yarn that would have been formed from fiber strands on the outer portion of the forming package and would have experienced the greatest amount of sizing migration during drying of the package. The quality of the fabric was evaluated in terms of streaking in the fill yarn and its overall color. More specifically, as used herein "streaking" refers to bands of discrete spotting or discoloration of the fabric due to colored residue deposits left on the heat cleaned fabric and "color" refers to general appearance of the fabric on a sliding scale from white to gray. For both streaking and color, each fabric was rated from 1 (best) to 10 (worst) at each evaluation location. A poorly heat cleaned fabric which exhibited excessive streaking and discoloration was used as a control reference and was rated a 10 for both measures at each evaluation location. A streaking rating of 1 means that the fabric exhibited no visually discernible spotting or marking and a color rating of 1 means that the fabric was white. Each fabric was evaluated by three graders and their ratings were averaged.

Table 3 shows the results of the tensile strength and heat cleaning tests. Each Fabric Sample corresponds to a fabric incorporating the corresponding silane identified in Table 2. A negative number in the heat cleaning ranking indicates that the sample was better than the control.

TABLE 3

| Fabric Sample | LOI | Heat Cleaning Ranking | | | | | | Tensile Test max. load (kg) |
|---|---|---|---|---|---|---|---|---|
| | | 1st yard | | 3rd yard | | 5th yard | | |
| | | streak | color | streak | color | streak | color | |
| A | 1.27 | 2.3 | 1.7 | 3.7 | 1.3 | 4.0 | 2.3 | 4.49 |
| B | 1.35 | 0.3 | 0.3 | 0.3 | 0.3 | 0.3 | 0.3 | 4.55 |
| C | 1.36 | 1.7 | 2.0 | 1.7 | 0.7 | 3.0 | 1.3 | 4.98 |
| D | 0.95 | 6.7 | 4.7 | 6.0 | 4.7 | 6.3 | 2.0 | 4.69 |
| E | 1.24 | 7.3 | 5.3 | 8.0 | 6.0 | 9.7 | 4.3 | 5.16 |
| F[8] | 1.12 | 7.2 | 5.6 | 7.1 | 4.3 | 8.7 | 3.1 | 5.32 |
| no silane[9] | 1.15 | 1.3 | 0.3 | 0.8 | −0.1 | 1.2 | 0 | 3.99 |
| 1[10] | 1.24 | 2.9 | 2.4 | 2.1 | 1.6 | 3.7 | 1.4 | 4.68 |
| 2 | 1.05 | 8.7 | 7.7 | 5.0 | 5.3 | 6.3 | 3.3 | 5.26 |

[8]average of 4 samples
[9]average of 3 samples
[10]average of 3 samples

In reviewing Table 3, Sample 1 exhibited heat cleaning and tensile strength properties that were comparable to or better than the other commercially available silanes. It is believed that the good heat cleaning properties of Sample 1 is the result, in part, of having a tertiary amine group that does not form colored species through oxidation and a saturated hydrocarbon grouping at the end of the ester (i.e. $R^4$ [see Formula II]) that is highly susceptible to thermal decomposition. Samples B and C exhibited slightly better heat cleaning properties during this test, however, it is suspected that yarn coated with sizing compositions including these commercially available silanes are more susceptible to filament breakage during subsequent fiber processing, such as weaving. It is believed that Sample 2 did not perform as well as Sample 1 because its structure was not as prone to thermal decomposition as Sample 1.

The sizing composition of the present invention facilitates good heat cleaning of treated fabrics. In addition, because the silane is more susceptible to heat degradation during heat cleaning, it is possible to modify the heat cleaning process by reducing the heating temperature and/or reducing the exposure time. This will result in less tensile strength loss and a higher tensile strength in the glass fibers. Furthermore, the sizing composition reduces the occurrences of colored residue deposits on the heat cleaned glass fiber fabric.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

We claim:

1. A glass fiber strand having improved heat cleaning properties comprising at least one glass fiber at least partially coated with a sizing composition prepared from ingredients comprising;

at least one starch;

at least one lubricant; and at least one silane coupling agent highly susceptible to thermal decomposition, comprising:

$[((R^1)_bY)_aR^2{}_3 SiR^3]_2$ NX wherein
$R^1$ and $R^2$ are each monovalent radials;
$R^3$ is a divalent linking group;
a is 1 to 3;
X is $(R^4)_bZC(=O)CH(Q)CH(Q)$—, wherein Z is $CH_2$, O, S or N, Q is H, alkyl, aryl, alkaryl, or $C(=O)ZR^4$ and $R^4$ is a hydrocarbon moiety of one to twenty carbon atoms, hydrogen, a silyl group or an organic polymer;
Y is oxygen, nitrogen or sulfur; and
b is 1 or 2 depending upon the valency of Y;
wherein the sizing composition is more easily removed from the at least one glass fiber when exposed to elevated temperatures of a heat cleaning process.

2. The glass fiber strand according to claim 1, wherein the a of the silane equals 3, Y of the silane is oxygen and $R^1$ of the silane is selected from the group consisting of: aryl, allyl, cycloalkyl, alkyl (linear or branched) or aralkyl.

3. The glass fiber strand according to claim 1, wherein $R^2$ of the silane is selected from the group consisting of a saturated hydrocarbon, an unsaturated hydrocarbon, cyano and combinations thereof.

4. The glass fiber strand according to claim 1, wherein $R^3$ of the silane is a $C_1$–$C_{12}$ alkylene.

5. The glass fiber strand according to claim 1, wherein $R^4$ of the silane is selected from the group consisting of a hydrocarbon moiety of one to twenty carbon atoms, hydrogen, and a silyl group.

6. The glass fiber strand according to claim 5, wherein Q of the silane is hydrogen and Z of the silane is oxygen.

7. The glass fiber strand according to claim 6, wherein the a of the silane equals 3 and $R^1$ of the silane is methyl or ethyl or a combination of methyl and ethyl.

8. The glass fiber strand according to claim 7, wherein $R^3$ of the silane is selected from the group consisting of propylene, n-butylene, di(ethylene) ethyl amine, dimethylene cyclohexane, dimethylene cyclohexene and polyoxyethylene.

9. The glass fiber strand according to claim 5, wherein the a of the silane equals 3, Y of the silane is oxygen, and $R^1$ of the silane is methyl, ethyl or silyl.

10. The glass fiber strand according to claim 9, wherein Q of the silane is hydrogen and $R^3$ of the silane is an alkylene group.

11. The glass fiber strand according to claim 1, wherein Y of the silane is oxygen.

12. The glass fiber strand according to claim 1, wherein the silane is $(CH_3)_3COC(=O)CH_2CH_2N[CH_2CH_2CH_2Si(OCH_3)_3]_2$.

13. The glass fiber strand according to claim 12, wherein the lubricant is selected from the group consisting of cationic lubricants, nonionic lubricants and combinations thereof, and further comprising an emulsifier.

14. The glass fiber strand according to claim 13, further comprising a humectant, a biocide and a defoamer.

15. The glass fiber strand according to claim 1, further comprising a humectant.

16. The glass fiber strand according to claim 1, further comprising a biocide.

17. The glass fiber strand according to claim 1, further comprising a defoamer.

18. The glass fiber strand according to claim 1, further comprising an emulsifier.

19. The glass fiber strand according to claim 1, wherein the lubricant is selected from the group consisting of cationic lubricants, nonionic lubricants and combinations thereof.

20. The glass fiber strand according to claim 1, wherein $R^4$ of the silane comprises a saturated hydrocarbon grouping.

21. A fabric woven from glass fiber strands according to claim 1.

22. An aqueous sizing composition that provides improved heat cleaning properties of glass fibers coated with the sizing composition, the sizing composition being prepared from ingredients comprising, in addition to water;
at least one starch;
at least one lubricant; and
at least one silane coupling agent highly susceptible to thermal decomposition, comprising:
$[((R^1)_bY)_aR^2{}_{3-a}SiR^3]_2$ NX wherein
$R^1$ and $R^2$ are each monovalent radials;
$R^3$ is a divalent linking group;
a is 1 to 3;
X is $(R^4)_bZC(=O)CH(Q)CH(Q)$—, wherein Z is $CH_2$, O, S or N, Q is H, alkyl, aryl, alkaryl, or $C(=O)ZR^4$ and $R^4$ is a hydrocarbon moiety of one to twenty carbon atoms, hydrogen, a silyl group or an organic polymer;
Y is oxygen, nitrogen or sulfur; and
b is 1 or 2 depending upon the valency of Y.

23. The aqueous sizing composition according to claim 22, wherein $R^4$ of the silane is selected from the group consisting of a hydrocarbon moiety of one to twenty carbon atoms, hydrogen, and a silyl group.

24. The aqueous sizing composition according to claim 23, wherein Q of the silane is hydrogen, Z of the silane is oxygen, the a of the silane equals 3, $R^1$ of the silane is methyl or ethyl or a combination of methyl and ethyl, and $R^3$ of the silane is selected from the group consisting of propylene, n-butylene, di(ethylene) ethyl amine, dimethylene cyclohexane, dimethylene cyclohexene and polyoxyethylene.

25. The aqueous sizing composition according to claim 23, wherein the a of the silane equals 3, Y of the silane is oxygen, $R^1$ of the silane is methyl, ethyl or silyl, Q of the silane is hydrogen and $R^3$ of the silane is an alkylene group.

26. The aqueous sizing composition according to claim 22, wherein the silane is $(CH_3)_3COC(=O)CH_2CH_2N[CH_2CH_2CH_2Si(OCH_3)_3]_2$.

27. The aqueous sizing composition according to claim 26, wherein the lubricant is selected from the group consisting of cationic lubricants, nonionic lubricants and combinations thereof, and further comprising an emulsifier, a humectant, a biocide and a defoamer.

28. The aqueous sizing composition according to claim 22, wherein the composition further includes at least one additional constituent selected from the group consisting of a humectant, a biocide, an emulsifier and a defoamer.

29. The aqueous sizing composition according to claim 22, wherein $R^4$ of the silane comprises a saturated hydrocarbon grouping.

* * * * *